Oct. 22, 1963   B. TEBB   3,107,406
BELT FASTENERS
Filed July 22, 1960   2 Sheets-Sheet 1
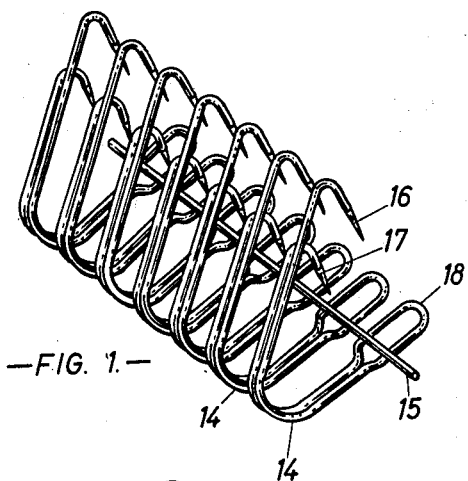
—FIG. 1.—
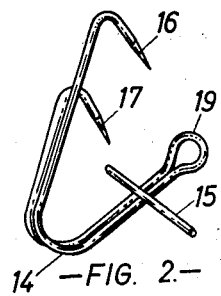
—FIG. 2.—
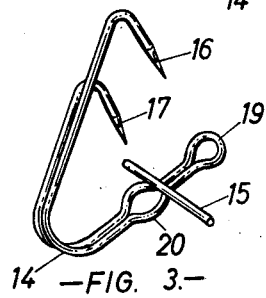
—FIG. 3.—
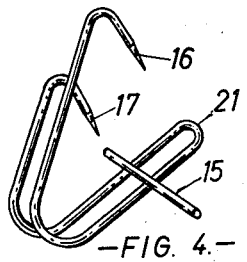
—FIG. 4.—
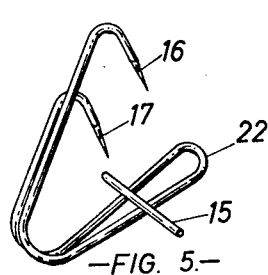
—FIG. 5.—
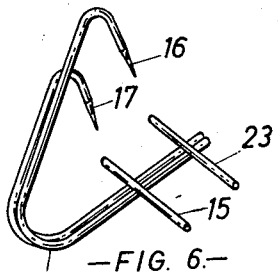
—FIG. 6.—
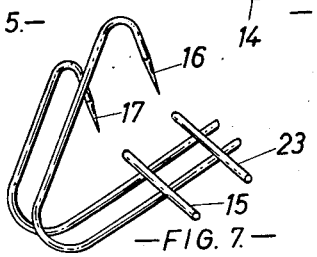
—FIG. 7.—
INVENTOR:
BERNARD TEBB
BY
Mead, Browne, Schuyler + Beveridge Oct. 22, 1963   B. TEBB   3,107,406
BELT FASTENERS
Filed July 22, 1960   2 Sheets-Sheet 2
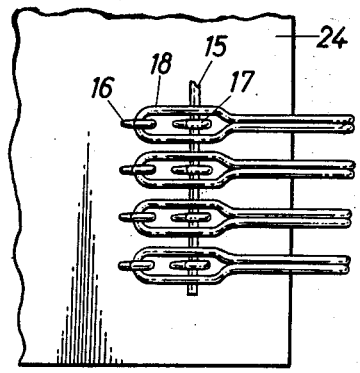
—FIG. 8.—
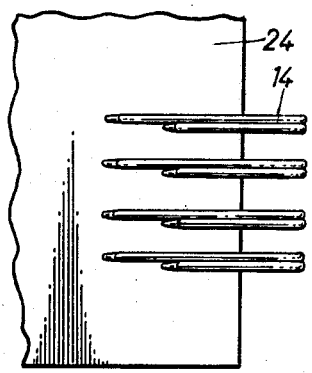
—FIG. 9.—
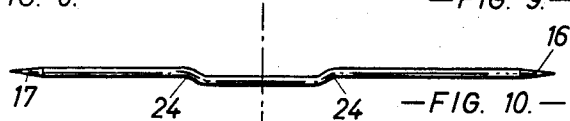
—FIG. 10.—
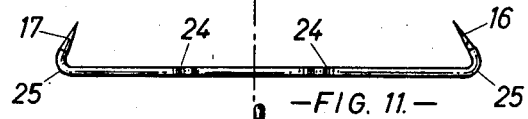
—FIG. 11.—
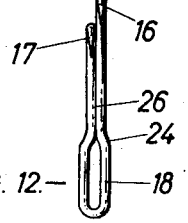
—FIG. 12.—
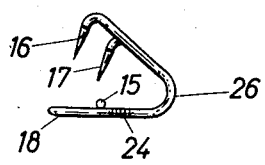
—FIG. 13.—
INVENTOR:
BERNARD TEBB
BY
Mead, Browne Schuyler + Beveridge United States Patent Office 3,107,406
Patented Oct. 22, 1963

3,107,406
BELT FASTENERS
Bernard Tebb, Swanland, England, assignor to Mastabar Mining Equipment Company Limited, Hull, England
Filed July 22, 1960, Ser. No. 44,679
Claims priority, application Great Britain Oct. 8, 1959
5 Claims. (Cl. 24—33)

This invention relates to fasteners of the type used for joining together the ends of power transmission or conveyor belts. The fasteners are usually made of wire, each fastener unit comprising a series of pointed hooks welded to a common connecting bar at desired intervals. In use, the points of the hooks are embedded in a belt end so that the hooks project as a series of loops from the belt end. These loops are linked to the loops formed by the hooks in an adjacent belt end by means of a pin passing through both sets of loops.

The conventional impregnated cotton fabric conveyor belts used in coal mines had a strength of about 1800 to 2000 lbs. per inch width for the thicknesses commonly used in the conveying of coal underground. Increased mechanization in mines found weaknesses in these belts and a search for a more robust belt to carry greater loads at higher speeds and having greater wear and tear resistance led to the use of synthetic fibres such as rayon, terylene and nylon in place of cotton fibres to give belts having a strength of about 2800 to 3000 or more lbs. per inch width. Wire hook fasteners having a holding strength of only about 1200 lbs. per inch width of belt are still used in belting joints. Consequently, if these are used for making joints in belting embodying synthetic fibres, the belting joints are considerably weaker than the belting itself and the points of the fasteners tend to pull out of the belting, owing to the unbending of the wire of the hooks, at comparatively low loads.

The invention provides a wire hook fastener adapted to be inserted in the end of a belt, said fastener comprising a pair of compound limbs arranged substantially in the form of a V, said limbs comprising two thicknesses of wire, each thickness having a point at one end, said points being spaced apart along the length of one limb and directed towards the other limb and the other limb carrying two abutments for said points correspondingly spaced apart along its length, the two thicknesses of wire being in contact along a major portion of the length of the limb carrying the points and the limbs of the fastener being arranged to be disposed one on either side of said belt with the points passing through the belt into contact with the abutments, each point being of a sufficient length to be bent over a corresponding abutment away from the belt end.

A fastener having two points may be formed from a length of wire, pointed at both ends and bent to form a hook fastener having limbs of two thicknesses of wire. Alternatively, the fastener may be formed by uniting two lengths of wire, each with a point at one end.

The invention will now be further described by way of example with reference to the accompanying drawings in which:

FIG. 1 is a perspective view of a wire hook fastener unit formed from seven wire hook fasteners according to the invention, Each of FIGS. 2 to 7 is a perspective view of a wire hook fastener alternative to those shown in FIG. 1, FIGS. 8 and 9 show opposite sides of a belt end into which the wire hook fasteners of FIG. 1 have been inserted, and FIGS. 10 to 13 illustrate successive stages in the formation of one of the wire hook fasteners shown in FIG. 1.

In the drawings, like numbers refer to like parts.

In FIG. 1, wire hook fasteners generally designated 14 are welded to a common connecting bar 15. Each fastener is formed from a length of wire, the ends of which form the points 16 and 17 on one limb of the fastener and a central portion of which forms the loop 18 on the other limb of the fastener. The connecting bar 15 crosses the loop 18 and forms an abutment for point 17. The outer end of the loop 18 forms an abutment for point 16.

The loop 19 of FIG. 2 is smaller than the loop 18 of FIG. 1 and the bar 15 crosses the limb of the fastener inwardly of the loop 19, which forms an abutment for the point 16.

The fastener of FIG. 3 differs from that of FIG. 2 in that an extra loop 20 is provided immediately inwardly of the bar 15 to serve, together with the bar 15, as an abutment for point 17.

In FIGS. 1 to 3, the limbs of the fasteners comprise two thicknesses of wire in contact. The limbs of the fastener of FIG. 4, comprise two thicknesses of wire separated by a distance less than the distance between adjacent fasteners 14 in FIG. 1. The fastener of FIG. 4 is formed from a length of wire, the ends of which form the points 16 and 17 and a central portion of which forms a bend 21 which serves as an abutment for point 16.

In FIG. 5, the outer end of the loop 22 serves as an abutment for the point 16. This fastener differs from that of FIG. 1 in that the loop 22 extends the full length of the limb.

The fastener of FIG. 6 is formed from two contiguous wires one of which forms point 16 and the other of which forms point 17. An additional connecting bar 23, to which the fastener is welded, serves as an abutment for point 16.

The fastener of FIG. 7 differs from that of FIG. 6 in that the wires which form the points 16 and 17 are separated by a distance less than the distance between adjacent fasteners 14 in FIG. 1.

In each of FIGS. 2, 4, 5, 6 and 7, the bar 15 serves as an abutment for point 17.

In FIGS. 8 and 9, the points of the fasteners pass into one side of a belt end 24 as shown in FIG. 9 and project from the other side. The points 16 and 17 are bent away from the belt end over the loop 18 and bar 15 respectively to lock the fastener in the belt end.

The fastener unit shown in FIG. 1 may be made in the following manner. Wire is drawn off a reel, straightened and cut to a length suitable for the size of hook fastener required. The ends of each length are then ground to form points 16 and 17. The ground lengths are passed into a hook forming machine (not shown) in which the following operations are carried out. Each length is bent as shown at 24 in FIG. 10 in which the length is viewed in plan. The points 16 and 17 are then bent as shown at 25 in FIG. 11 in which the length is viewed from the front. The length is then bent about a point midway between the bends 24, 24 to the shape shown in plan in FIG. 12. The partly made wire hook fastener shown in FIG. 12 is then bent at 26 to give the fastener seen as a side view in FIG. 13. The finished fasteners are held on a former (not shown) in the desired spaced relationship and the connecting bar 15 welded thereto. The operations are carried out continuously, the fasteners with bar attached being produced as a continuous length which is cut into units. The sequence of operations described in FIGS. 10 to 13 may be varied, if desired.

The wire hook fasteners of FIGS. 1, 2, 3, 5 and 6 may have a holding strength of up to 2000 lbs. per inch width of belting, corresponding to a hook strength of approximately 700 lbs. per hook and a pitch of ⅜″, due to the fact that not only are the points 16 and 17 arranged to hold on two different lines of weft in the belt end (the weft being parallel to the belt end) but these points are also arranged to act substantially in line parallel to the length of the belting.

Because the points of the fasteners lock with the abutments, the strength of the wire used and its diameter are of relatively minor importance as regards the holding strength of the fastener in the belt. Therefore a mild steel wire drawn to a tensile strength of 50 to 60 tons per square inch and of diameter not exceeding 0.1 inch, for example 0.092 inch, is adequate for forming the wire hook fasteners of this invention.

I claim:
1. A wire hook fastener adapted to be inserted in the end of a belt, said fastener comprising a pair of compound limbs arranged substantially in the form of a V, said limbs comprising two thicknesses of wire in contact along a major portion of their length, each thickness having a point at one end, said points being spaced apart along the length of one limb and directed towards the other limb and the other limb carrying two abutments for said points correspondingly spaced apart along its length, the limbs of the fastener being arranged to be disposed one on either side of said belt with the points passing through the belt into contact with the abutments, each point being of a sufficient length to be bent over a corresponding abutment away from the belt end.

2. A wire hook fastener unit adapted to be inserted in the end of a belt, said unit comprising a series of wire hook fasteners and a common connecting bar for said fasteners, each of said fasteners comprising two thicknesses of wire in contact along a major portion of their length arranged to form a pair of limbs substantially in the form of a V, each thickness of wire having a point at one end, said points being spaced apart along the length of one limb of the fastener and directed towards the other limb and the other limb being secured to said common connecting bar and being provided at its free end with a wire loop, said common connecting bar and said loop being positioned to serve as abutments for said points and the limbs of each fastener being arranged to be disposed one on either side of said belt with the points passing through the belt into contact with the abutments, each point being of a sufficient length to be bent over a corresponding abutment away from the belt end.

3. A wire hook fastener unit adapted to be inserted in the end of a belt, said unit comprising a series of wire hook fasteners and two common connecting bars for said fasteners, each of said fasteners comprising two thicknesses of wire in contact along a major portion of their length arranged to form a pair of limbs substantially in the form of a V, each thickness of wire having a point at one end, said points being spaced apart along the length of one limb of the fastener and directed towards the other limb and the other limb being secured to each of said common connecting bars, said common connecting bars being positioned to serve as abutments for said points and the limbs of each fastener being arranged to be disposed one on either side of said belt with the points passing through the belt into contact with the abutments, each point being of a sufficient length to be bent over a corresponding abutment away from the belt end.

4. A belt and a plurality of wire hook fasteners inserted in the end of said belt, each fastener comprising a pair of limbs arranged substantially in the form of a U, said limbs comprising two thicknesses of wire in contact along a major portion of their length, each thickness having a point at one end, said points being spaced apart along the length of one limb and directed towards the other limb and the other limb carrying two abutments for said points correspondingly spaced apart along its length, the limbs of each fastener being disposed one on either side of said belt and the points passing through the belt into contact with the abutments, each point being of a sufficient length to be bent over a corresponding abutment away from the belt end, and each point being bent over said abutment away from the belt end.

5. A wire hook fastener adapted to be inserted in the end of a belt, said fastener comprising a pair of compound limbs arranged substantially in the form of a V, said limbs comprising two thicknesses of wire, each thickness having a point at one end, said points being spaced apart along the length of one limb and directed towards the other limb and the other limb carrying two abutments for said points correspondingly spaced apart along its length, the two thicknesses of wire being in contact along a major portion of the length of the limb carrying the points and the limbs of the fastener being arranged to be disposed one on either side of said belt with the points passing through the belt into contact with the abutments, each point being of a sufficient length to be bent over a corresponding abutment away from the belt end.

References Cited in the file of this patent
UNITED STATES PATENTS

| | | |
|---|---|---|
| 1,755,304 | Olsen | Apr. 22, 1930 |
| 2,032,005 | Crick | Feb. 25, 1936 |
| 2,168,355 | Lyon | Aug. 8, 1939 |
| 2,840,898 | Yeo | July 1, 1958 |
| 2,912,732 | Stolz et al. | Nov. 17, 1959 |

FOREIGN PATENTS

| | | |
|---|---|---|
| 1,082,778 | Germany | June 2, 1960 |